United States Patent Office 3,014,073
Patented Dec. 19, 1961

3,014,073
1,3 - BIS(NITROGUANIDINO) - 2 - NITROXYPROPANE, 1,3-BIS(GUANIDINIUM) - 2 - HYDROXYPROPANE AND THE PREPARATION THEREOF
John A. Gallaghan, Box 142, Rte. 1, and Robert Evans, Box 712, both of Indian Head, Md.
No Drawing. Filed Apr. 23, 1956, Ser. No. 580,144
13 Claims. (Cl. 260—564)
(Granted under Title 35, U.S. Code (1952), sec. 266)

The invention described herein may be manufactured and used by or for the Government of the United States of America for governmental purposes without the payment of any royalties thereon or therefor.

The present invention relates to new and useful chemical compounds and to a method for their preparation. More particularly, the invention comprises the preparation of new series of compounds which have the general structural formulae

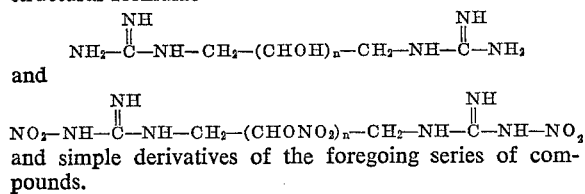

and simple derivatives of the foregoing series of compounds.

This application is a continuation-in-part of Serial No. 505,074, filed April 29, 1955, now abandoned.

The new compounds of the invention have been found to possess many desirable properties that are both unusual and widely useful in the field of organic chemistry. For example, many of the new compounds are useful as explosives and propellants, as compatible ingredients which produce desirable modifications in the properties of both mono-base and multi-base explosives and propellants, and as intermediates in the synthesis of numerous and diverse substances, such as therapeutic agents, explosives and propellants. The new compounds of the invention have been found to be useful in increasing the ignitability of cool propellants which have been found desirable for use in modern rapid fire guns. Because of their stability and resistance to moisture they are useful as substitutes for black powder in ignition mixtures. They may be used to increase the burning rate of rocket propellants and the large volume of gases evolved make them useful in underwater explosive mixtures. In addition solutions of these compounds are useful as components in jet fuel compositions.

It is an object of the present invention to provide new series of compounds of the general structural formulae above described, and simple derivatives thereof.

It is a further object of the invention to provide methods of preparation for the new series of compounds and simple derivatives thereof, above described.

It is still a further object of the invention to provide new compounds in accordance with the invention.

Still other objects and advantages of the present invention will be apparent to those skilled in the art as the invention is hereinafter more particularly described, it being clearly understood that the following detailed description is given by way of illustration and explanation only, and not by way of limitation.

The foregoing objects are accomplished by a method comprising the following steps, which may be illustrated for reasons of clarity and conciseness only by the following general reactions:

(A)
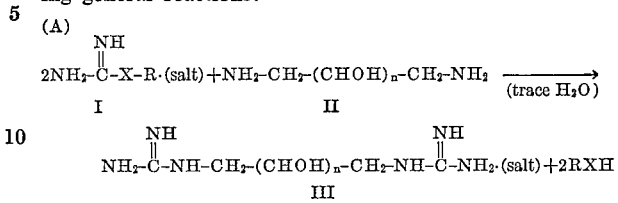

wherein X is either oxygen or sulfur and R is a lower alkyl group, preferably from 1 to 5 carbon atoms, and $n$ is 1 or a numeral greater than 1 and preferably from 1 to 5.

(B)
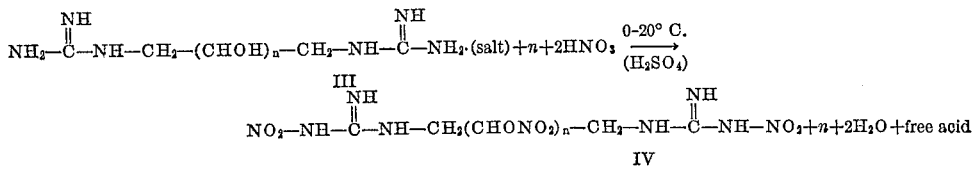

Referring to Reaction A, the pseudourea shown as I is preferably a salt thereof such as, for example, a sulfate salt and is preferably reacted in substantially stoichiometric quantities with II. The reaction may be carried out with or without a solvent, water or ethyl alcohol being examples of suitable solvents, but a trace of water is helpful in starting the reaction when water is not present as solvent. The temperature and time of reaction does not appear critical and any suitable temperature and time of reaction may be used such as, for example, about 1 to 2 hours at room temperature or at a temperature of about 20–85° C. The reaction product III, which comprises a new series of compounds, may be recovered in substantially pure form from the reaction mixture by any suitable method such as, for example, cooling the reaction mixture and pouring over cracked ice, separating the product thus obtained, dissolving the separated product in a minimum of hot water, and then precipitating out the pure product III with methanol.

Referring to Reaction B, the pure product III from Reaction A may be nitrated in any suitable manner to yield the new series of compounds IV, such as, for example by means of sulfuric-nitric acid mixture. The reaction may be carried out without solvent other than the acid mixture at any suitable temperature, such as for example about 0–20° C., and the reaction is usually complete in from 30 minutes to 1 hour. The reaction product IV, which likewise comprises a new series of compounds, may be recovered in substantially pure form from the reaction mixture by any suitable method such as for example, cooling the reaction mixture and pouring over cracked ice, separating the product thus obtained, and then removing the impurities by extraction with hot water. Recrystallization is usually not necessary.

In order to more clearly disclose the nature of the present invention, a specific example will hereinafter be described in detail, it being understood that such description is by way of example only and not for the purpose of restricting the scope of the invention.

EXAMPLE I

*Preparation of 1,3-bis(guanidinium)-2-hydroxypropane sulfate*

An alcohol solution of equimolar quantities of methyl thiopseudourea sulfate and 1,3-diamino-2-hydroxy propane was reacted with stirring at room temperature for a period of about 2 hours, and the reaction mixture poured over cracked ice. The crude reaction product was separated and purified by dissolving in a minimum amount of hot water and then precipitating out the pure product 1,3-bis(guanidinium)-2-hydroxy propane sulfate in white crystals melting at 234–235° C. (dec.). An analysis for C, H, and N gave the following results:

Calculated for $C_5H_{14}ON_6 \cdot H_2SO_4$: C, 22.05; H, 5.92; N, 30.87. Found: C, 22.29; H, 5.87; N, 30.54.

The free compound 1,3-bis(guanidinium)-2-hydroxy propane, may be obtained by the usual well known procedure.

EXAMPLE II

*Preparation of 1,3-bis(nitro-guanidino)-2-nitroxy propane*

1,3-bis(guanidinium)-2-hydroxy propane, as above prepared, was nitrated by means of a sulfuric-nitric acid mixture at about 0–20° C. for a period of about 20 minutes to 1 hour. A slight excess of nitric acid over the calculated amount was used, and from 2–3 parts by weight sulfuric acid to 1 part by weight of nitric acid. The reaction mixture was poured over cracked ice and the reaction product, 1,3-bis(nitroguandino)-2-nitroxy propane, separated as a finely divided white solid. Impurities were removed by extraction with warm water, and a product of satisfactory purity for most purposes may be obtained thereby. The new compound forms very small micaceous crystals from a hot water solution and melts at 160–161° C. (dec.). An analysis for C, H, and N gave the following results:

Calculated for $C_5H_{11}O_7N_9$: C, 19.42; H, 3.59; N, 40.77. Found: C, 19.57; H, 3.75; N, 40.71.

As an example of the use of these compounds in cool propellants, 1,3 bis(nitroguanidino)-2 nitroxy propane prepared as described above may be used to improve the ignitability of a propellant composition as a partial replacement for nitroguanidine in a 3 in 70 gun ammunition as follows:

| | Percent |
|---|---|
| Nitrocellulose | 20.0 |
| Nitroglycerine | 9.0 |
| Nitroguanidine | 45.0 |
| Ethyl centralite | 2.0 |
| Dibutyl phthalate | 9.0 |
| 1,3-bis(nitroguanidino)-2-nitroxypropane | 15.0 |

The propellant having the above composition was prepared in the following manner. The nitrocellulose was placed in a mixer and mixed for 5 minutes. The nitroguanidine was then put in the mixer and the mixing continued for 10 minutes. The 1,3-bis(nitroguanidino)-2-nitroxypropane was then added and mixed for 20 minutes. The nitroglycerine and dibutyl phthalate were added followed by the acetone and the mixture mixed for 30 minutes. The ethyl centralite was dissolved in acetone and added to the mixture. The entire mixture was then mixed for an additional 3 hours and 15 minutes. After the mixing the mass was blocked, screened and extruded. The extruded powder was cut in the required lengths and air dried for 1 day and for 4 days in a powder magazine at 45° C.

A satisfactory cool propellant may also be prepared in the manner outlined above if the nitroguanidine is completely replaced by 1,3 bis(nitroguanidino)-2-nitroxypropane. The latter compound has also been found to be useful as an additive to other explosives such as RDX and ammonium nitrate to increase their ignitability.

An example of a composite propellant useful in a rocket motor is as follows:

| | Percent |
|---|---|
| Ammonium nitrate | 60 |
| 1,3 bis(nitroguanidino)-2-nitroxypropane | 25 |
| Cellulose acetate | 15 |

It is obvious to those skilled in the art that the new series of compounds designated herein as III and IV have many reactive groups such as, for example, $=\!N\!-\!H$, $-\!NH\!-$, $-\!NH_2$, $-\!CHOH$, $-\!CHONO_2$, and $-\!NO_2$, and that one or more of such reactive groups may enter into a large number of well known reactions under known experimental conditions to produce derivatives thereof. Accordingly, it is to be understood that such derivatives are within the scope of the invention.

Obviously many modifications and variations of the present invention are possible in the light of the above teachings. It is, therefore, to be understood that within the scope of the appended claims the invention may be practiced otherwise than as specifically described.

What is claimed as new and desired to be secured by Letters Patent of the United States is:

1. Compounds of the general formula

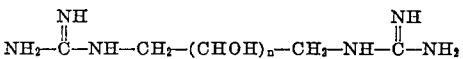

wherein $n$ is a number from 1–5.

2. Compounds of the general formula

wherein $n$ is a number from 1–5.

3. The compound 1,3-bis(guanidinium)-2-hydroxy propane.

4. The compound 1,3-bis(nitroguanidino)-2-nitroxy propane.

5. The method of preparing a salt of a compound of the general formula

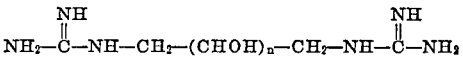

wherein $n$ is a number from 1–5 which comprises the steps of reacting a salt of a compound of the general formula

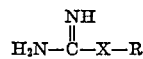

wherein X is an element selected from the group consisting of oxygen and sulfur and R is a lower alkyl group, with substantially stoichiometric amounts of a compound of the general formula

to form a salt of a product of the general formula

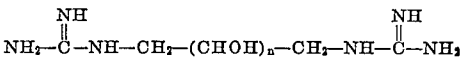

precipitating the crude product from the reaction mixture, and recovering the product.

6. The method of claim 5 wherein said product is a salt of 1,3-bis-(guanidinium)-2-hydroxy propane.

7. The method of preparing a compound of the general formula

wherein $n$ is a number from 1–5 which comprises the steps of nitrating a compound of the general formula

at a temperature of about 0–20° C., precipitating the crude reaction product, and recovering the product of the general formula

8. The method of claim 7 wherein said product is 1,3-bis(nitroguanidino)-2-nitroxy propane.

9. The method of preparing a compound of the general formula

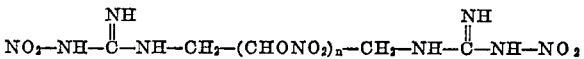

wherein $n$ is a number from 1–5 which comprises the steps of reacting a salt of a compound of the general formula $$H_2N-\overset{NH}{\underset{\|}{C}}-X-R$$

wherein X is an element selected from the group consisting of oxygen and sulfur and R is a lower alkyl group, with substantially stoichiometric amounts of a compound of the general formula $$NH_2-CH_2-(CHOH)_n-CH_2-NH_2$$

to form a salt of a first product of the general formula $$NH_2-\overset{NH}{\underset{\|}{C}}-NH-CH_2-(CHOH)_n-CH_2-NH-\overset{NH}{\underset{\|}{C}}-NH_2$$

recovering the said first product from the reaction mixture, nitrating the said first product at a temperature of about 0–20° C. to form a second product of the general formula $$NO_2-NH-\overset{NH}{\underset{\|}{C}}-NH-CH_2-(CHONO_2)_n-CH_2-NH-\overset{NH}{\underset{\|}{C}}-NH-NO_2$$

precipitating the said second crude product from the second reaction mixture, and recovering the said second product.

10. The method of claim 9 wherein said second product is 1,3-bis(nitroguanidino)-2-nitroxy propane.

11. The method of preparing a compound which comprises the steps of reacting a salt of a compound having the general formula $$H_2N-\overset{NH}{\underset{\|}{C}}-X-R$$

wherein X is an element selected from the group consisting of oxygen and sulfur and R is a lower alkyl group, with substantially stoichiometric amounts of a compound of the general formula $$NH_2-CH_2-[CHOH]_n-CH_2-NH_2$$

wherein $n$ is a number from 1–5, precipitating the product of the reaction from the reaction mixture and nitrating said product at a temperature of from about 0° to about 20° C.

12. The method of preparing a compound which comprises the steps of reacting a salt of a compound having the general formula $$H_2N-\overset{NH}{\underset{\|}{C}}-X-R$$

wherein X is an element selected from the group consisting of oxygen and sulfur and R is a lower alkyl group, with substantially stoichiometric amounts of a compound of the general formula $$NH_2-CH_2-[CHOH]_n-CH_2-NH_2$$

wherein $n$ is a number from 1–5 and precipitating the product from the reaction mixture.

13. The method of preparing a compound which comprises the steps of nitrating a compound of the general formula $$NH_2-\overset{NH}{\underset{\|}{C}}-NH-CH_2-[CHOH]_n-CH_2-NH-\overset{NH}{\underset{\|}{C}}-NH_2$$

wherein $n$ is a number from 1–5 at a temperature from about 0° to about 20° C. and precipitating the reaction product from the reaction mixture.

References Cited in the file of this patent

UNITED STATES PATENTS

| | | |
|---|---|---|
| 2,254,009 | Hechenbleikner | Aug. 26, 1941 |
| 2,573,489 | Rheiner et al. | Oct. 30, 1951 |
| 2,674,619 | Lundstad | Apr. 6, 1954 |
| 2,767,154 | Weihe | Oct. 16, 1956 |

FOREIGN PATENTS

| | | |
|---|---|---|
| 611,235 | Great Britain | Oct. 27, 1948 |